United States Patent
Varma et al.

(10) Patent No.: US 7,334,435 B2
(45) Date of Patent: Feb. 26, 2008

(54) PRODUCTION OF FIRE RESISTANT LAMINATES

(75) Inventors: Karikath Sukumar Varma, Southport (GB); John Richard Holland, Ormskirk (GB); David William Holden, Wigan (GB)

(73) Assignee: Pilkington plc, St. Helens (GB)

( * ) Notice: Subject to any disclaimer, the term of this patent is extended or adjusted under 35 U.S.C. 154(b) by 590 days.

(21) Appl. No.: 10/380,308

(22) PCT Filed: Sep. 17, 2001

(86) PCT No.: PCT/GB01/04149

§ 371 (c)(1),
(2), (4) Date: Mar. 13, 2003

(87) PCT Pub. No.: WO02/24445

PCT Pub. Date: Mar. 28, 2002

(65) Prior Publication Data

US 2003/0186063 A1    Oct. 2, 2003

(30) Foreign Application Priority Data

Sep. 20, 2000  (GB) ................................. 0023020.1

(51) Int. Cl.
C03C 17/00  (2006.01)
C03C 27/00  (2006.01)

(52) U.S. Cl. ....................... 65/60.5; 65/60.51; 65/60.52

(58) Field of Classification Search ................ 65/17.2, 65/30.1, 60.5, 60.51, 60.52, 60.7, 60.8; 428/428, 428/630

See application file for complete search history.

(56) References Cited

U.S. PATENT DOCUMENTS

| | | | | |
|---|---|---|---|---|
| 4,190,698 A | * | 2/1980 | De Boel et al. ............ 428/334 |
| 5,035,951 A | * | 7/1991 | Dimanshteyn .............. 428/446 |
| 5,397,645 A | * | 3/1995 | Varma et al. ............... 428/413 |
| 6,838,180 B1 | * | 1/2005 | Goelff et al. ............... 428/432 |
| 6,929,691 B1 | * | 8/2005 | Holland et al. ............. 106/635 |
| 2005/0016742 A1 | * | 1/2005 | Varma et al. ................. 169/43 |
| 2005/0255323 A1 | * | 11/2005 | Varma et al. ............... 428/428 |

FOREIGN PATENT DOCUMENTS

JP      51069519 A  *  6/1976
JP      05117043 A  *  5/1993

* cited by examiner

*Primary Examiner*—Carlos Lopez
(74) *Attorney, Agent, or Firm*—Marshall & Melhorn LLC

(57) ABSTRACT

Process for the production of an intumescent fire resistant layer by drying a waterglass solution on the surface of a glass substrate are carried out in the presence of a salt of a carbonic acid or an α-hydroxy carboxylic acid such as potassium citrate. The drying is preferably carried out at a rate which reduces of pH of the solution by no more than 2 units during an initial drying period of 5 hours. The resulting interlayers provide improved fire resistance.

11 Claims, No Drawings

PRODUCTION OF FIRE RESISTANT LAMINATES

BACKGROUND OF THE INVENTION

This invention relates to novel methods for the production of waterglass compositions, to the compositions produced by such methods and to fire resistant glass laminates comprising such compositions as an intumescent layer between two opposed panes of glass.

Glass laminates incorporating an intumescent inorganic layer sandwiched between two opposed panes of glass are known and are sold under the Trade Marks PYROSTOP and PYRODUR by the Pilkington group of companies. When such laminates are exposed to a fire the inorganic layer intumesces and expands to form a foam. The foam provides a thermally insulating layer which protects the pane of glass remote from the fire so that the structural integrity of the glass unit is maintained and thereby presents a barrier to the propagation of the fire. The insulating properties of the foam layer reduce the amount of heat transmitted through the layer and thereby reduce the risk of combustion of materials on the non-fire side of the glass unit. Glass laminates incorporating such inorganic layers have been successfully used as fire resistant glass structures. Such laminates may comprise more than two glass panes sandwiching more than one inorganic layer. Depending upon the stringency of the relevant regulation laminates comprising as many as eight inorganic layers, have been used. The multi-layered laminates are relatively thick and correspondingly expensive.

The intumescent inorganic layer is normally formed mainly from a sodium silicate waterglass or a mixture thereof with a potassium silicate waterglass. In addition the layer may comprise a minor quantity of a polyhydric organic compound such as a glycol, glycerine and its derivatives or a sugar. The inorganic layer is normally formed by preparing an aqueous solution of the waterglass, applying the solution to one of the panes of glass and drying the excess water so as to form the inorganic layer. Typically the inorganic layer will comprise approximately 20% by weight of water (including water of hydration) and varying amounts of $Na_2SiO_2$, $Na_6Si_2O_7$ and $Na_2Si_3O_7$. The waterglass solutions and the inorganic layer may contain varying ratios of $Na_2O$ to $SiO_2$ and may also comprise potassium containing species by introduction of $K_2O$ as an alternative to the $Na_2O$.

The drying step must be carried out under carefully controlled conditions if an optically clear layer having useful intumescent properties is to be obtained. Typically the drying is carried out at high humidity and over a long period say from 12 to 24 hours. This lengthy process adds to the cost of the manufacturing process and reduces the productivity of the production facility.

U.S. Pat. No. 4,190,698 discloses glass laminates in which the interlayer is a silicate waterglass and proposes a variety of adjuvants to the waterglass including glycerine, ethylene glycol, sorbitol, glucose, starch, sodium phosphate, sodium aluminate aluminium phosphate, borax, boric acid and colloidal silica. These adjuvants are stated to improve the fire resistant performance of the interlayer.

The adjuvant which is most commonly added to a silicate waterglass to form an interlayer having advantageous properties is glycerol. The presence of glycerol reduces the cracking of the interlayer during the drying process and thereby facilitates the formation of a clear dried interlayer.

The fire resistance of these glazings comprising these interlayers depends on part upon the integrity of the glazing being maintained for as long as possible even whilst the glass panes are cracking under the stress. In some instances the glass cracks in a catastrophic fashion and the glazing may fail the particular test as a result. We have observed that these failures may be associated with the formation of a relatively coarse foam when the interlayer is heated.

DESCRIPTION OF THE PREFERRED EMBODIMENTS

We have now discovered that the addition of a salt of a carbonic acid or of an α-hydroxy carboxylic acid to the waterglass solution prior to the drying step leads to the production of an intumescent layer having an improved fire resistant performance. These layers produce a finer foam on exposure to flame and applicants believe that this is indicative of improved fire resistant performance. The presence of the salt may also enable the drying process to be carried out over a shorter period of time without any detrimental effect upon the quality of the product thus improving the productivity of the production facility.

From one aspect this invention provides a process for producing an inorganic intumescent layer upon the surface of a glass substrate which comprises spreading a solution of an alkali metal waterglass upon the surface of the glass and evaporating water from that solution until the inorganic layer is formed wherein the waterglass solution comprises an alkali metal salt of a carbonic acid or α-hydroxy carboxylic acid. The salt which is employed will preferably be one which does not significantly detract from the optical properties of the intumescent layer or from the fire resistant performance thereof.

Examples of useful salts include the metal salts and especially the alkali metal salts of α-hydroxy carboxylic acids such as citric acid, malic acid, tartaric acid, glycollic acid and lactic acid have all been found to be useful in the processes of this invention. Salts of weak inorganic acids such as the alkali metal carbonates and bicarbonates have been found to be useful.

The quantity of salts required in order to be effective will vary with the choice of buffering agent and with the composition of the waterglass solution. Generally the waterglass solution may comprise from 0.1 to 2.0 preferably from 0.5 to 1.0% by weight of the salt (prior to drying). The optimum quantity of any particular salt may be determined by empirical means. The use of an excessive quantity of any particular salt can lead to the formation of a dried intumescent layer having inferior fire resistant properties compared to the known systems or which is unacceptably hazy.

The alkali metal silicate waterglass is preferably a sodium silicate waterglass. The preferred waterglasses for use in the compositing of the present invention are-those wherein the weight ratio of $S_iO_2:Na_2O$ is at least 2:1 more preferably those wherein the weight ratio is at least 2.5:1 and most preferably those wherein the weight ratio is at least 2.85:1.

Alkali metal silicate waterglass other than sodium silicate waterglasses in particular potassium silicate and lithium silicate waterglasses may also be useful in the compositions of this invention. Potassium silicate waterglasses wherein the weight ratio $S_iO_2:K_2O$ is in the range 1.4:1 to 2.1:1 are especially useful. Compositions which comprise a mixture of a sodium silicate based waterglass and a potassium silicate waterglass may also be useful.

The waterglass solutions which are spread onto the glass surface during the processes of this invention will generally have a pH in the range 10.0 to 12.0 more preferably in the range 10.5 to 11.8. Typically these solutions will comprise from 50 to 70% by weight of water. At the end of the drying process the water content of the inorganic intumescent layer is from 15 to 26% by weight more preferably from 18 to 22% by weight. The effective pH of the solution will reduce in line with the proportional decrease in ionic mobility during the drying process. As the water is evaporated and the layer begins to solidify the pH becomes a less meaningful measure of the properties of the layer.

In the preferred embodiments of the invention we have discovered that the pH of the solution should fall by no more than 2 units of pH over an initial period of 5 hours. during the drying step. Over this period the water content of the waterglass solution is preferably reduced from say 60% to a value in the range 30 to 35% by weight. In the preferred embodiments of this invention this initial part of the drying process will be carried out under controlled conditions and the rate of water loss will be broadly the same or longer than that currently used to dry waterglass solutions of the same depth in the absence of the salts of this invention. However in the processes of this invention carried out we prefer that the later part of the drying process be completed in a shorter time. The overall drying time in a typical prior art process may be anything from 12 to 24 hours. In the preferred processes of this invention the overall drying time may be as little as 10 or 15 hours although longer times may be utilised if desired.

The improved fire resistant performance of the inorganic intumescent layers formed in the processes of the present invention means that relatively thin intumescent layers may be sufficient to achieve an equivalent fire resistant performance. In the processes of this invention the depth of the intumescent layer upon the surface of the glass may be reduced from 1.4 mm to 1.0 mm and more preferably 0.7 mm. The quantity of water which needs to be evaporated in order to produce the dried intumescent layer is correspondingly reduced and the time required to dry the solution is also reduced. However even in these embodiments it is preferred to carry out the initial part of the drying process under carefully controlled conditions and at a relatively slow rate. Attempts to dry the solution more rapidly in this early part of the drying process tend to result in the formation of inorganic layers having inferior properties and in the extreme unacceptable properties.

The waterglass solutions useful in the processes of the present invention preferably includes a polyhydric organic compound. The use of such polyhydric compounds is known in the art. Typically the polyhydric compound will be selected from the group comprising the glycols, glycerine or a derivative of glycerine or a sugar. The most preferred organic polyhydric compound is glycerol. Preferably the waterglass solutions (prior to the drying step) will comprise from 2.0 to 10.0% by weight of polyhydric compound.

The waterglass solutions useful in the processes of the present invention are preferably prepared in a manner which avoids the production of any local extremes of pH value. Conveniently the salt may be dissolved in an aqueous solution of the polyhydric organic compound. The resulting solution may then be added slowly and with good stirring to a waterglass solution to form a solution which is useful in the processes of this invention.

The inorganic intumescent layers may conveniently be produced by spreading the waterglass solution onto the surface of a sheet of glass and subsequently evaporating water from the solution. In order to produce an inorganic intumescent layer of the desired thickness upon the glass it is necessary to provide an edge barrier on the glass comprised for example from clay-like materials which will retain the waterglass solution during the evaporation step. Such techniques are well known in the art. The evaporation of water from the waterglass solution is preferably carried out by drying it in an oven at a temperature of from 70° C. to 105° C. for a period of up to 24 hours.

The rate of evaporation of the water may conveniently be controlled by varying the relative humidity in the atmosphere. By maintaining a very high relative humidity (up to 100 RH) during the initial part of the drying step the rate of drying may be maintained at a relatively low level. Later in the process the Relative Humidity may be reduced in order to increase the rate of drying.

When the evaporation is complete the coated glass sheet may be removed from the oven and the retaining borders removed by cutting the edges from the sheet. The product is a glass sheet having an inorganic intumescent layer upon one surface thereof. These sheets can be conveniently cut to size and formed into laminated glass units by further laminating processes.

The glass sheets with the intumescent coatings may be formed into laminates by adding a second glass sheet. This second sheet may be uncoated, in which case the product is a laminate having a single intumescent layer.

Alternatively the second glass may also be coated with an inorganic intumescent layer. It is possible to produce laminates having more than one intumescent layer which may be useful where enhanced fire resistance is required.

The use of sheets having relatively thin intumescent layers represents a preferred embodiment of the production of laminates because the laminated glass unit may be thinner than the conventional units and yet give equivalent fire resistant performance.

EXAMPLE 1

A transparent fire resistant glazing was made as follows:—

A pane of soda-lime glass 3 mm thick had a moisture and heat resistant barrier applied around its circumference to form a 5 mm high dam.

Tripotassium citrate (30 parts) was dissolved in deionised water (30 parts) and stirred to form a clear solution. This was mixed with glycerol (87% Aqueous solution, 69 parts) and stirred until homogenous. This solution was poured into a sodium silicate solution (38.1% Aqueous, 901 parts) with vigorous stirring.

The resultant solution was poured onto the aforementioned pane at a distribution of 5 kg m$^{-2}$.

The solution was dried in an oven at 100° C. Steam was injected into the oven until relative humidity reached 100%. The oven was closed and the solution dried for 14 hours to a residual water content of 20→30%, and a thickness of about 1.4 mm. The dried edge barrier,was removed and a second pane of soda-lime glass bonded to the silicate layer.

This bonded laminated was fire tested under the conditions specified in BS.476 PT. 20-22. The-laminate exceeded 60 minutes integrity as specified in the standard, at which time the furnace was switched off.

By way of comparison a laminate was manufactured in an identical manner, except that tripotassium citrate was not added to the glycerol.

Under identical test conditions this laminate failed after 37 minutes.

The invention claimed is:

1. A process for the production of an intumescent layer upon the surface of a glass substrate which comprises spreading a solution of an alkali metal waterglass upon the surface of the glass and evaporating water from that solution until an inorganic layer is formed, wherein the waterglass solution comprises an alkali metal salt of carbonic acid or an α-hydroxy carboxylic acid.

2. A process according to claim 1, wherein the α hydroxy carboxylic acid is selected from the group comprising citric acid, malic acid, tartaric acid, glycolic acid and lactic acid.

3. A process according to claim 1, wherein the waterglass solution which is spread onto the surface of the glass has a pH in the range 10.5 to 11.8.

4. A process according to claim 1, wherein the pH of the waterglass solution falls by no more than 2 units of pH during the first 5 hours of the drying step.

5. A process according to claim 1, wherein the waterglass solution comprises from 0.1 to 2.0% by weight of the salt.

6. A process according to claim 1, wherein the waterglass solution comprises a polyhydric compound.

7. A process according to claim 6, wherein the polyhydric compound is a glycol, glycerin or a derivative of glycerin or a sugar.

8. A process according to claim 7, wherein the polyhydric compound is glycerol.

9. A process according to claim 1, wherein the glass substrate having the waterglass solution spread on the surface thereof is placed in a heated oven to dry.

10. A process according to claim 1, wherein the water content of the inorganic intumescent layer formed thereon, is in the range 30 to 35% by weight.

11. A process according to claim 1, wherein the inorganic intumescent layer is from 0.3 to 5.0 mm thick.

* * * * *